J. P. NIKONOW.
GEAR SHIFTING MECHANISM.
APPLICATION FILED MAY 25, 1914.

1,182,102.

Patented May 9, 1916.
3 SHEETS—SHEET 1.

WITNESSES:
M. A. Schübler
J. R. Langley

INVENTOR
John P. Nikonow
BY
Wiley J. Carr
ATTORNEY

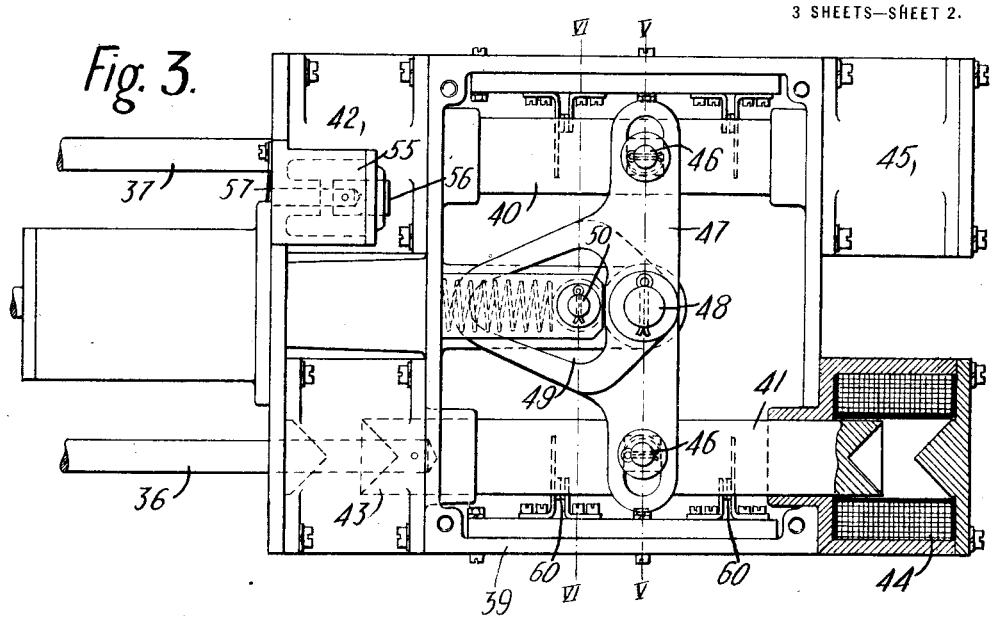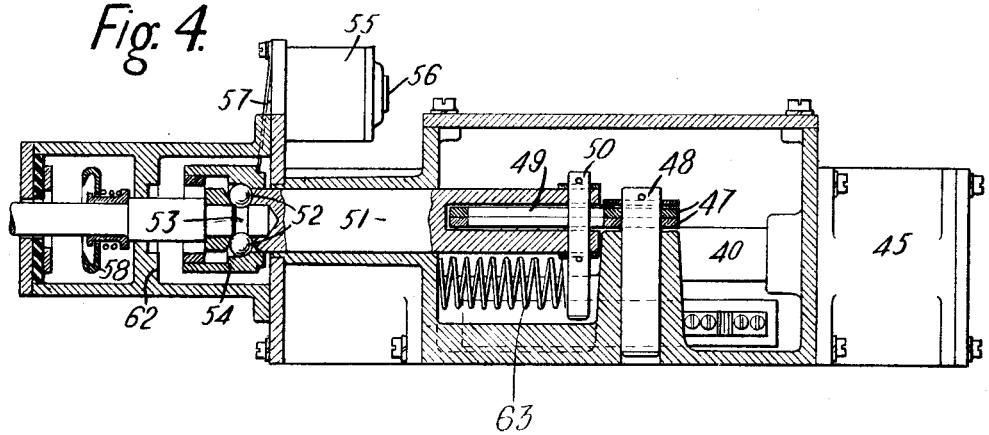

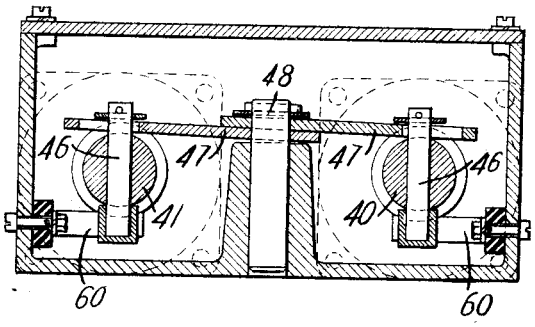
Fig. 5.
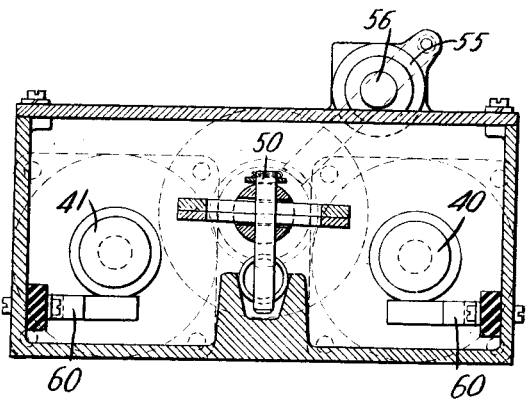
Fig. 6.
Fig. 7.
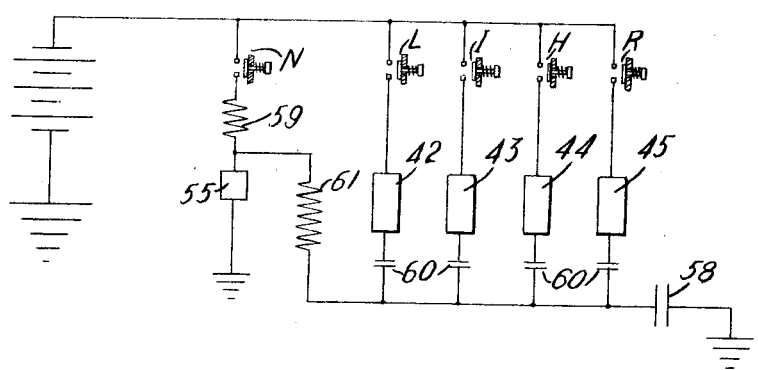

UNITED STATES PATENT OFFICE.

JOHN P. NIKONOW, OF WILKINSBURG, PENNSYLVANIA, ASSIGNOR TO WESTINGHOUSE ELECTRIC AND MANUFACTURING COMPANY, A CORPORATION OF PENNSYLVANIA.

GEAR-SHIFTING MECHANISM.

1,182,102.      Specification of Letters Patent.      Patented May 9, 1916.

Application filed May 25, 1914. Serial No. 840,717.

*To all whom it may concern:*

Be it known that I, JOHN P. NIKONOW, a subject of the Czar of Russia, and a resident of Wilkinsburg, in the county of Allegheny and State of Pennsylvania, have invented a new and useful Improvement in Gear-Shifting Mechanism, of which the following is a specification.

My invention relates to gear-shifting mechanisms and particularly to such mechanisms as are actuated by electromagnets to control the shiftable gear wheels of the transmission mechanisms of automobiles or other motor vehicles.

My invention has for its object to provide a mechanism of the character indicated above, that is simple in construction and efficient in operation to automatically return the shifted gear wheels to a neutral position before they can be adjusted for a different speed ratio.

In the operation of gear-shifting mechanisms, as heretofore constructed, it has been necessary, ordinarily, to employ separate operations in order to return the shifted gear wheel to its neutral position and to adjust the transmission mechanism for another speed ratio. This method of operation necessitates that an appreciable interval shall elapse between the separate operations. It is highly desirable that these operations succeed each other immediately in order that the change of speed ratios may be accomplished by a continuous operation.

I provide a mechanism in which the defect above specified is avoided. The actuating mechanism automatically returns the shifted gear wheel to its neutral position before the gear wheel to be shifted to produce a second speed ratio is actuated from its neutral position, the two operations being accomplished by a continuous movement of the actuating means.

Figure 1:
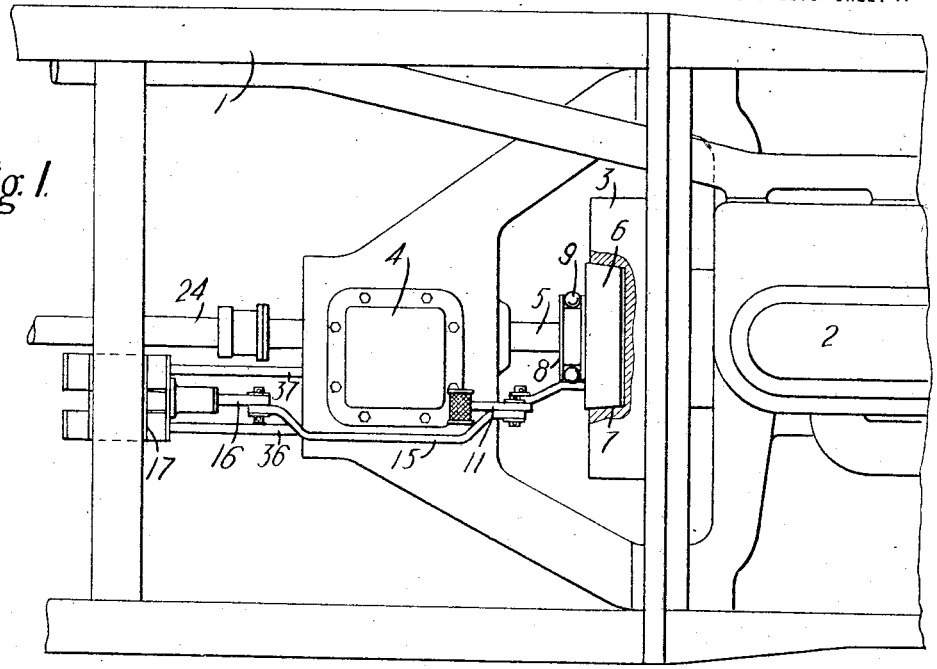
Figure 2:
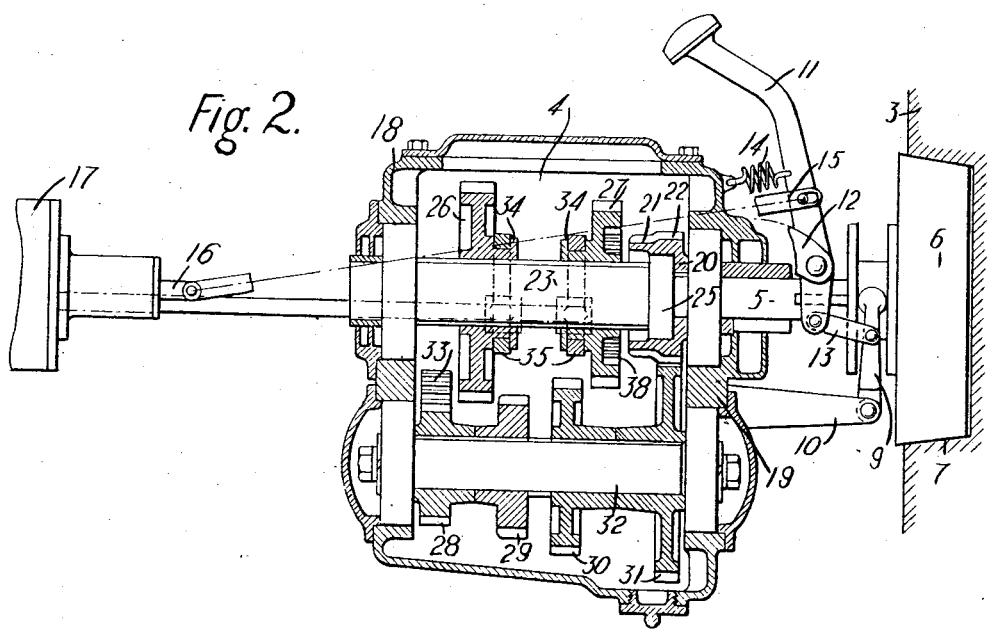

In the accompanying drawings, Figure 1 is a view, partially in plan and partially in section, of a portion of an automobile with my invention attached thereto. Fig. 2 is a view, partially in elevation and partially in section, of the transmission mechanism of an automobile and its related parts. Fig. 3 is a view, partially in plan and partially in section, of the gear shifting mechanism. Fig. 4 is a view in longitudinal section, of the mechanism of Fig. 3. Figs. 5 and 6 are views, in transverse section, on the lines V—V and VI—VI, respectively, of the mechanism shown in Fig. 3. Fig. 7 is a diagrammatic view of the electrical circuits employed in connection with my invention.

Referring particularly to Figs. 1 and 2, an automobile chassis 1, only a portion of which is shown, is provided with a gas engine 2 having a fly wheel 3. A transmission mechanism or change-speed gear mechanism 4 is connected to the engine 2 by a shaft 5 and a conical clutch member 6 that is slidably mounted on the shaft 5 to coact with a correspondingly shaped clutch member 7 formed in the fly wheel 3. The clutch member 6 is provided with an integral grooved collar 8 to be engaged by a yoke member 9 that has a pivotal support upon a bracket 10. A pedal lever 11, that is adapted to be operated by the foot of the operator, has a pivotal support upon a lug 12 and is connected by a link 13 to the yoke member 9. A spring 14, that is attached at one end to a suitable stationary part, normally retains the clutch pedal lever 11 in its rearward position, with the clutch member 6 engaging the clutch member 7 in the fly wheel 3. The lever 11 has a lost-motion connection to a link 15 which connects it to a rod 16 of a gear-shifting mechanism indicated at 17.

The transmission mechanism 4 forms no part of my invention but is so combined therewith, that a description thereof is desirable in order to explain the operation of the gear-shifting mechanism. The shaft 5, which is connected to the clutch member 6, extends into the transmission casing 18, through an end wall 19 and has a bearing therein. A gear wheel 20, having two sets of gear teeth 21 and 22, is mounted upon the shaft 5 within the casing 18. The transmission shaft 23, which is connected to the main transmission shaft 24, is in axial alinement with the shaft 5 and has a bearing at 25 within the gear wheel 20. The shaft 23 is adapted to be connected to the shaft 5 at different speed ratios by means of two gear wheels 26 and 27 that are slidably keyed upon the shaft 23, gear wheels 28, 29, 30 and 31 that are fixed upon a counter shaft 32, and an idler gear wheel 33 that is in mesh with the gear wheel 28.

The gear wheel 31 is always in mesh with the gear wheel 20 to connect the shafts 5 and 32. The mechanism is arranged to provide three speeds in the forward and one in the reverse direction. The changes in speed ratio are controlled by the slidable gear wheels 26 and 27 which are respectively provided with integral grooved collars 34 to be engaged by yoke members 35. The yoke members 35 are respectively fixed upon shift rods 36 and 37 that are controlled by the gear-shifting mechanism, as will be later described.

When the gear wheel 26 is in mesh with the gear wheel 29, the mechanism is in its first or low-speed position, and the shaft 5 is connected, through the gear teeth 22, gear wheel 31, counter shaft 32 and gear wheels 29 and 26, to the transmission shaft 23. For the second or intermediate speed, the gear wheel 27 is shifted into mesh with the gear wheel 30. For the third or high speed, the gear wheel 27 is shifted to the right until internal gear teeth 38, with which the gear wheel 27 is provided, mesh with the gear teeth 21. The shaft 5 is then directly connected to the transmission shaft 23, and the latter is driven at engine speed. For driving in the reverse direction, the gear wheel 26 is shifted into mesh with the idler gear wheel 33 which is always in mesh with the gear wheel 28. The transmission mechanism is illustrated in its neutral or inoperative position, in which the shaft 23 is not connected to the counter shaft 32.

Referring now to Figs. 3, 4, 5 and 6, the gear-shifting mechanism comprises a housing or casing 39 of substantially rectangular shape. Two shift rods 40 and 41 are slidably mounted in the end walls of the casing and project therethrough to form the movable core members of electro-magnets 42, 43, 44 and 45. In the normal position of the shift rods, as illustrated in Fig. 3, the ends of the rods are withdrawn from the corresponding magnets. The shift rods are thus adapted to be shifted from the neutral position, in either direction, according to the energization of the several electromagnets. Each of the rods 40 and 41 is provided at substantially its mid-portion, with a pin 46 that extends therethrough and is connected to one of a pair of levers 47 that are pivotally mounted on a stationary pin 48. The levers 47 are provided, at the opposite end, with a triangular opening 49 through which projects a pin 50 to connect the levers to a reciprocable rod 51.

The rod 51 is connected to the rod 16 by means of a mechanism comprising balls 52 which may be held in a groove 53 in the end of the rod 16 by a sleeve member 54 that is slidably mounted upon the rod 51. The position of the sleeve member 54 relatively to the rod 51 is controlled by an auxiliary electromagnet 55, the movable core member 56 of which engages a blade spring 57 that, in turn, engages the sleeve member 54. A switch 58, which controls the connection of a battery to the several main electromagnets, is controlled by the rod 15 which has a lost-motion connection to the lever 11 in order to permit the manipulation of the engine clutch without actuating the gear-shifting mechanism.

The electrical circuits that are employed to control the gear-shifting mechanism are illustrated in Fig. 7. Five circuits are connected in parallel relation to a storage battery and are controlled by a set of push buttons that may be conveniently located upon the steering wheel or other suitable place. Four of the parallel circuits respectively comprise the main electromagnets 42, 43, 44 and 45 and push buttons that are designated, according to the speed ration controlled by them, as L, I, H and R (reverse). The switch 58, which is controlled by the lever 11, is in series with the several main electromagnets. The remaining circuit comprises the auxiliary electromagnet 55, at resistor 59 and a push button designated by N (neutral). Each of the four circuits first described is controlled by a self closing limit switch 60. The auxiliary electromagnet 55 is connected to the several main electromagnets through a resistor 61. By means of this arrangement, the electromagnet 55 will be energized upon the closing of either of the several push buttons. The circuit through the resistor 61 is of sufficiently high resistance to limit the energization of the main magnets, while permitting the flow of current of a value sufficient to fully energize the electromagnet 55. A low-resistance circuit will be established for that main magnet, the circuit of which has been partially completed by one of the push buttons, when the switch 58 has been closed by the actuation of the pedal lever 11 to the limit of its path of movement.

It may be assumed that the transmission gear mechanism is in its neutral position, as illustrated in Fig. 2, and that the gear-shifting mechanism is in its corresponding normal or neutral position, as illustrated in Fig. 3. It may be assumed, also, that the engine has been started and that the engine clutch members 6 and 7 are disengaged. It is desired to start the vehicle on first speed and the push button designated by L is accordingly pressed to complete a circuit from the battery through the push button L, electromagnet 42, limit switch 60, resistor 61 and electromagnet 55 to ground. The clutch pedal lever 11, which, at the time of starting the engine, is in such a position that the engine clutch members 6 and 7 are out of engagement, is then pressed forwardly beyond the clutch-disengaging position to close the switch 58. The closing of the switch 58 completes a low-resistance circuit for the electromagnet 42, and it is thereupon energized to draw the shift rod 40 to the left (Fig. 3). The gear wheel 26, which is connected to the shift rod 40, is thereby shifted into mesh with the gear wheel 29. When the gear wheels 26 and 29 are fully meshed, the pin 46 will have opened the corresponding limit switch 60 to break the circuit of the electromagnets 42 and 55. The operator then allows the spring 14 to retract the clutch pedal lever 11 and the rod 16 to their respective normal positions. The engine clutch is still out when the various parts of the gear-shifting mechanism are in their respective normal or neutral positions. Further return movement of the clutch pedal will effect the engagement of the engine clutch, and the vehicle will be driven through the connections above described.

When it is desired to change the speed ratio, as, for example, to intermediate speed, the push button designated by I may be pressed at any time desired, in advance of the actual change. The magnet 55 will be energized in the manner above described, in connection with the push button L, to actuate the core member 56 to the left, Fig. 4, and thereby cause the spring 57 to slide the sleeve member 54 to the left and thus lock the balls 52 in engagement with the groove 53 of the rod 16. The rod 51 is now connected to the clutch lever 11. To effect the change to the desired speed, the operator presses the clutch lever 11 to disengage the engine clutch. The rod 40 is in its shifted position, and the corresponding lever 47, which has been rocked about the pin 48 as a pivot, is in such a position that the pin 50 is adjacent to one side of the triangular opening 49. The further actuation of the lever 11, after the clutch is out, operates to shift the rod 40 to its neutral position by means of the pin 50 and the lever 47, the pin 50 exerting a cam action upon the side of the triangular portion of the lever 47. When this position is reached, the sleeve member 54 has engaged a stop member 62, and a further movement of the rods 16 and 51 causes the connection between the rods to be broken by the release of the balls 52. A spring 63 returns the rod 51 to its normal position. The further movement of the lever 11 and the rod 16 closes the switch 58 and thus completes a low-resistance circuit for the electromagnet 43, which is thereupon energized to shift the rod 41 to the left (Fig. 3). At the end of this movement, the gear wheel 27 is in mesh with the gear wheel 30, and the pin 46 has opened the corresponding limit switch 60 to open the circuits of the electromagnets 43 and 55. The return movement of the lever 11 by the spring 14 effects engagement of the engine clutch, and the vehicle will be driven at second speed. In the same manner, changes may be made to high speed or the direction of drive reversed, by actuating the appropriate push buttons. It will, of course, be understood that, in order to reverse the direction of the vehicle, it is necessary to bring it to a stop before the clutch is thrown in.

When it is desired to return either of the shiftable gear wheels 26 and 27 to the neutral position, the neutral button N is closed to energize the electromagnet 55. The clutch is disengaged as before, whereupon the rods 16 and 51 are actuated to the left (Fig. 3). The pin 50 is in a position to immediately engage the lever 47 that has been shifted from its neutral position. The shifted rod 40 or 41, as the case may be, will then be returned to its neutral position, in the manner above described, and the rod 51 will be disengaged from the rod 16. It will then be impossible to shift the gear wheels until one of the buttons, other than the neutral button N, is operated to partly complete the corresponding circuit, and the clutch lever has been actuated to the limit of its path of movement to close the switch 58.

It will be noted that I provide a mechanism by means of which the shifted gear wheels may be returned to a neutral position and the transmission mechanism adjusted for a different speed ratio by a continuous movement of a single actuating member. The gear-shifting mechanism and the clutch pedal lever are so related that it is impossible to close the circuit of either of the actuating magnets until a push button has been depressed and the engine clutch is disengaged.

I claim as my invention:

1. In a gear-shifting mechanism, the combination with a shiftable member and a lever connected thereto, of means for shifting said member in either direction from a neutral position, a rod having a lost-motion connection to said lever, a clutch lever, and means for connecting said clutch lever to said rod.

2. In a gear-shifting mechanism, the combination with a shift member, and the usual clutch lever, of means for temporarily connecting said lever to said member, said means comprising a rod, a relatively movable sleeve member, and means for controlling the position of said sleeve member.

3. In a gear-shifting mechanism, the combination with a shift member, and a clutch lever, of means comprising a rod and a relatively movable sleeve member for connecting the lever to said member, and electromagnetic means for controlling said sleeve member.

4. In a gear-shifting mechanism, the combination with a shiftable member, and a plurality of electromagnets for shifting said member, of a clutch lever, means comprising a sleeve member for connecting said lever to said member, and an auxiliary electromagnet for controlling said connecting means.

5. In a gear-shifting mechanism, the combination with a shiftable member and a lever connected thereto, of a clutch lever, a grooved rod connected to the clutch lever, means for engaging said grooved rod, and an electromagnet for controlling said engaging means.

6. In a gear-shifting mechanism, the combination with a shiftable member, and a plurality of electromagnets for shifting said member, a clutch lever, means for connecting said lever to said member, said means comprising two rods and means for detachably connecting them, and an auxiliay electromagnet in circuit with each of the other electromagnets for controlling said detachable connecting means.

7. In a gear-shifting mechanism, the combination with a pair of shift rods, and means for shifting said rods in opposite directions from a neutral position, of a pair of levers connected to said rods, a rod having a lost-motion connection to said levers, and means for actuating said rod.

8. In a gear-shifting mechanism, the combination with a pair of shift rods, and electromagnetic means for shifting said rods in opposite directions from a neutral position, of means for returning said rods to a neutral position, said means comprising a clutch lever, a rod connected to said shift rods, and means controlled in common with said electromagnetic means for connecting said clutch lever to said rod.

In testimony whereof, I have hereunto subscribed my name this 21st day of May, 1914.

JOHN P. NIKONOW.

Witnesses:
H. T. GEORGE,
B. B. HINES.